(12) United States Patent
Yang et al.

(10) Patent No.: US 7,881,985 B2
(45) Date of Patent: Feb. 1, 2011

(54) ELECTRONIC MARKETPLACE PROVIDING SERVICE PARTS INVENTORY PLANNING AND MANAGEMENT

(75) Inventors: Hong M. Yang, Coppell, TX (US);
Rajeev V. Pany, Coppell, TX (US);
Prabhu Natarajan, Irving, TX (US);
Abhijit A. Bhide, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 573 days.

(21) Appl. No.: 09/791,481

(22) Filed: Feb. 22, 2001

(65) Prior Publication Data
US 2001/0034673 A1 Oct. 25, 2001

Related U.S. Application Data

(60) Provisional application No. 60/183,919, filed on Feb. 22, 2000.

(51) Int. Cl.
*G06Q 40/00* (2006.01)
(52) U.S. Cl. .................................................... 705/28
(58) Field of Classification Search ............. 705/28–29
See application file for complete search history.

(56) References Cited

U.S. PATENT DOCUMENTS

| | | | | | |
|---|---|---|---|---|---|
| 5,287,267 | A | * | 2/1994 | Jayaraman et al. | 705/10 |
| 5,353,339 | A | * | 10/1994 | Scobee | 379/201.12 |
| 5,765,143 | A | * | 6/1998 | Sheldon et al. | 705/28 |
| 5,946,662 | A | * | 8/1999 | Ettl et al. | 705/8 |
| 5,974,395 | A | * | 10/1999 | Bellini et al. | 705/9 |
| 6,012,041 | A | * | 1/2000 | Brewer et al. | 705/28 |
| 6,018,567 | A | * | 1/2000 | Dulman | 379/32.03 |
| 6,151,582 | A | * | 11/2000 | Huang et al. | 705/8 |
| 6,263,265 | B1 | * | 7/2001 | Fera | 701/19 |
| 6,324,522 | B2 | * | 11/2001 | Peterson et al. | 705/28 |
| 6,330,499 | B1 | * | 12/2001 | Chou et al. | 701/33 |
| 6,341,271 | B1 | * | 1/2002 | Salvo et al. | 705/28 |
| 6,430,541 | B1 | * | 8/2002 | Brown et al. | 705/28 |
| 6,486,899 | B1 | * | 11/2002 | Bush, Jr. | 345/855 |
| 6,560,509 | B2 | * | 5/2003 | Williams et al. | 700/216 |
| 6,857,014 | B1 | * | 2/2005 | Paterson et al. | 709/223 |

OTHER PUBLICATIONS

Fleischmann et al., "Quantitative models for reverse logistics: A review", Jun. 1, 1997, European Journal of Operational Research, Elsevier Science B.V., all pages.*

* cited by examiner

*Primary Examiner*—James A Kramer
*Assistant Examiner*—Jessica L Lemieux
(74) *Attorney, Agent, or Firm*—Booth Udall, PLC; Steven J. Laureanti

(57) ABSTRACT

Service parts inventory planning and management are provided for one or more entities in a supply chain (12), preferably within the context of an electronic marketplace (14). Status data reflecting substantially current service parts inventory levels at stocking locations within the supply chain (12) is accessed, these inventory levels indicating service parts excesses or needs at one or more stocking locations. A substantially current service parts inventory plan is generated according to the status data, a service parts demand forecast, and a supply chain model, the inventory plan including target stocking levels for service parts at stocking locations. According to the inventory plan, one or more services are initiated to attempt to resolve service parts excesses or needs at stocking locations through interaction with one or more other entities.

40 Claims, 4 Drawing Sheets

ELECTRONIC MARKETPLACE PROVIDING SERVICE PARTS INVENTORY PLANNING AND MANAGEMENT

RELATED APPLICATIONS

This application claims the benefit under 35 U.S.C. §119 (e) of U.S. Provisional Application Ser. No. 60/183,919, filed Feb. 22, 2000.

TECHNICAL FIELD OF THE INVENTION

This invention relates in general to the field of electronic commercial transactions and in particular to an electronic marketplace providing service parts inventory planning and management.

BACKGROUND OF THE INVENTION

Service parts supply chains have traditionally been neglected in many industrial environments. In many enterprises, materials requirements planning (MRP), enterprise resource planning (ERP), and other initiatives have been given higher priority, leaving the organization that handles service parts and returns as a mere cost center receiving little or no strategic planning support. This often leads to the development of one-time solutions that fail to consider many relevant issues and result in unavailability of service parts, delayed service fulfillment, and associated customer dissatisfaction. At the same time, especially as the Internet becomes more ubiquitous, customer care is increasingly seen as a differentiator among competitors, especially in industries in which customers rely significantly on the availability of their key capital assets.

A growing requirement for many enterprises is the ability to better manage the "reverse logistics" flow of service parts that are defective or are otherwise returned for replacement or repair. The flow of such aftermarket service parts may often provide a valuable source of re-salable service parts, potentially reducing the need to purchase or manufacture new service parts. Enterprises which effectively manage reverse logistics flows can reduce their costs significantly. Reverse logistics flow, however, is typically considered to involve a supply chain which is separate from the primary manufacturing and distribution supply chain of the enterprise and is often managed under sales and/or customer service organizations.

Service parts must typically be obtained from inventory since customers have an immediate need for the service parts and associated service. A primary goal in service planning is therefore maintaining adequate service parts inventory to satisfy customer demands as they occur. In multi-echelon inventory systems, the locations from which inventory is deployed may significantly impact the overall service level achieved. The rate of new product introduction and the need to support products for longer durations has resulted in an explosion in the number of service parts that must be stored. With physical storage space at a premium, an emerging issue is how to best make use of available space. For various reasons, forecasting of service parts demand and planning service parts inventories may be very difficult. However, the budget available to make such deployment decisions is often limited, making it desirable to identify an efficient and effective solution that avoids service parts excesses or needs. Previous techniques have been inadequate to satisfy the needs of many enterprises.

SUMMARY OF THE INVENTION

According to the present invention, problems and disadvantages associated with prior inventory planning and management techniques have been substantially reduced or eliminated.

In one embodiment, a system for providing service parts inventory planning and management for one or more entities in a supply chain includes one or more planner applications. One or more of the planner applications, and thus the planner applications collectively, receive status data reflecting substantially current service parts inventory levels at one or more stocking locations in a supply chain, the inventory levels indicating service parts excesses or needs at one or more of the stocking locations. One or more of the planner applications, and thus the planner applications collectively, access a service parts demand forecast for at least a portion of the supply chain, access a model of at least a portion of the supply chain, and generate a substantially current service parts inventory plan according to the status data, the demand forecast, and the model, the inventory plan comprising target stocking levels for service parts at one or more stocking locations in the supply chain. A manager application receives the inventory plan and, according to the inventory plan, initiates one or more services in an attempt to resolve at least a portion of the service parts excesses or needs at one or more of the stocking locations through interaction with one or more other entities.

The present invention provides a number of technical advantages over previous inventory management techniques. The present invention provides a robust, secure, dynamic, and scalable framework to support hosted planning and transaction services available to one or more participating enterprises. The present invention enables these enterprises to access, through an electronic marketplace, various forecasting, planning, scheduling, collaboration, procurement, inventory listing, auction, and other desirable services. Participating enterprises may include those that use service parts for regular operations, those that manufacture, distribute, or sell service parts to others, and those that otherwise belong to a service parts supply chain. The present invention provides such enterprises with hosted access to intelligent inventory planning and management services that support customer care based on a simultaneous consideration of multiple aspects of the supply chain and, preferably, of reverse logistics information associated with a returns supply chain.

Using the planning and management services available through the marketplace, participating enterprises may reduce costs associated with excess inventories of certain service parts while also reducing the equipment downtime, inefficient customer service, customer complaints, the cost of customer care, and other problems resulting from an under-availability of other service parts. For example, enterprises in the airline industry may benefit from improved service parts availability and predictability, resulting in far fewer delayed and canceled flights, lower operating costs, and higher overall customer satisfaction. Enterprises in the automobile industry may similarly benefit from these supply chain efficiencies, making any lean manufacturing processes more manageable, available-to-promise (ATP) and build-to-order (BTO) goals more realistically met, and rush orders and the associated overtime costs less frequent. Enterprises within the high tech, medical equipment, and almost any other industry may expect to experience these or other similar benefits.

Systems incorporating any one or more of these or other technical advantages, whether in the context of an electronic marketplace or in another context, may be well suited for use in modem commercial environments. Other technical advantages will be readily apparent to those skilled in the art from the following figures, descriptions, and claims.

DETAILED DESCRIPTION OF THE INVENTION

Figure 1:
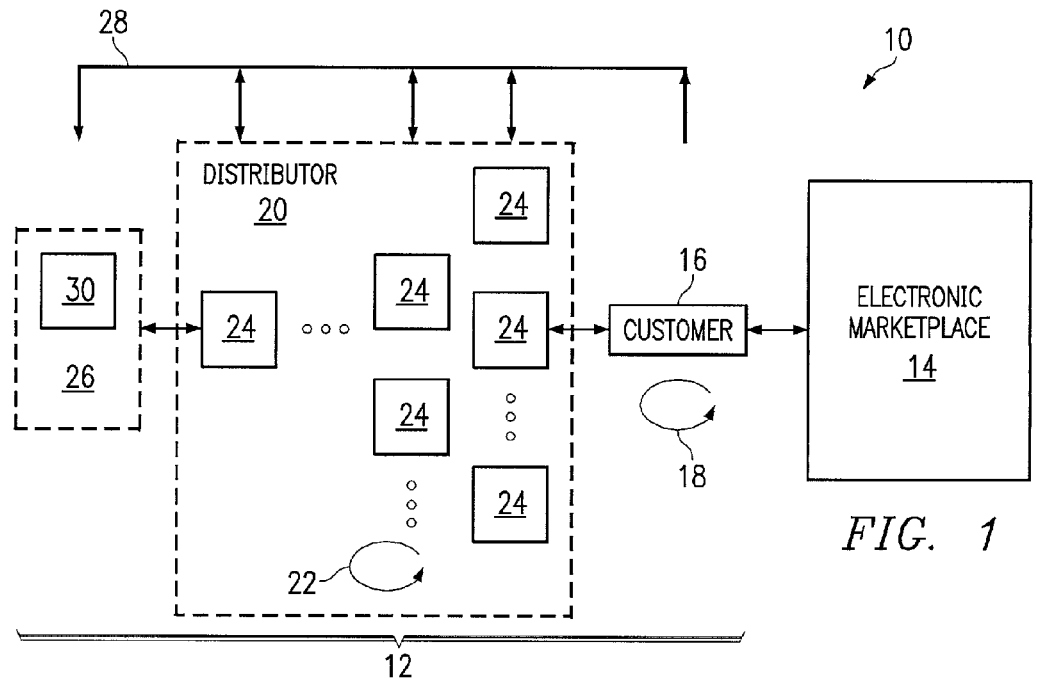
FIG. 1 illustrates an exemplary system that includes a service parts supply chain and an electronic marketplace that provides service parts inventory planning and management for one or more entities in the supply chain.

FIG. 1 illustrates a system 10 that includes a service parts supply chain 12 and a business-to-business ("B2B") electronic marketplace 14 providing service parts inventory planning and management for one or more entities associated with the supply chain 12. In general, service parts may include assemblies, components, or other parts that are used in connection with service to a previously sold product. For example, an automobile may require service at some point following its sale to an end user and, in connection with the service, one or more parts may need to be installed to replace an existing part that has failed, needs upgrading, has been recalled, or is otherwise being replaced. As another example, at some point following sale of the automobile, one or more parts may need to be installed to improve the automobile's safety, performance, appearance, or other characteristics. Other scenarios involving other types of service parts will be apparent to those skilled in the art. Those skilled in the art will appreciate that the present invention is intended to encompass all types of service parts.

Supply chain 12 is associated with a customers 16, which may be any enterprise or other entity that uses service parts in connection with its business operations. For example, the customer 16 might be an automobile dealership having a parts and service department that is supplied with service parts through the supply chain 12. Where the customer 16 is a larger enterprise, the customer 16 typically maintains an inventory of service parts in an internal supply chain 18, for example, involving multiple distribution centers dedicated solely to the customer 16. The inventory is typically spread between consumable service parts (which may be sold or used as is) and repairable service parts (which must be repaired before being sold or used). Customer 16 typically adopts a replenishment model to maintain a steady inventory of service parts within its internal supply chain 18, the objective being to ensure that service parts are always available in sufficient quantities to allow the customer 16 to conduct business operations. In some cases, instead or in addition to holding dedicated inventory within its own supply chain 18, customer 16 may enter into outsourcing agreements with one or more distributors 20 by which the distributors 20 assume the responsibility to maintain inventory at a level sufficient to provide a specified level of service to customer 16. Customer 16 may not maintain (itself or through distributors 20) an inventory of all the service parts that it requires. The customer 16 typically determines which service parts are most important (based on criticality constraints and other suitable information) and then seeks only to maintain an appropriate inventory level for those selected service parts.

Distributors 20 maintain service parts inventory within supply chains 22, such that they can supply service parts to one or more customers 16 at a suitable level in response to demand from customers 16. Each distributor 20 may have a multi-echelon supply chain 22, with larger more centralized distribution centers 24 supplying smaller more geographically dispersed distribution centers 24. An internal distribution network of supply chain 22, including distribution centers 24, may be referred to as an internal warehouse hierarchy. Within its warehouse hierarchy, distributor 20 has visibility into and responsibility for managing service parts inventory. In supply chain 22, the lower levels of the warehouse hierarchy place demands on higher levels, typically terminating at the lowest level with a "master" distribution center 24. Master distribution center 24 consolidates all service parts demand for supply chain 22 and procures the appropriate service parts from one or more external suppliers 26. There is often a need to move inventory between distribution centers 24 within supply chain 22, for example, where excesses at one or more distribution centers 24 may be used to offset needs at one or more other distribution centers 24.

Distribution centers 24 other than master distribution center 24 may need to be replenished from outside the internal warehouse hierarchy of distributor 20 in certain circumstances. As an example, if a distribution center at a first level cannot meet the demand from one or more distribution centers 24 at a second higher level, then the distribution center 24 at the first level may need to procure service parts from outside supply chain 22 to supply the distribution centers 24 at the second level. Instead or in addition, distribution centers 24 at the second level may need to procure service parts from outside supply chain 22 due to the lack of supply from the distribution center 24 at the first level. A primary difference between reliance on other distribution centers 24 within the supply chain 22 and reliance on such "out-of-network" sources is the lack of visibility into and control over inventory associated with the "out-of-network" sources. Relationships and rules governing flow of service parts between entities within supply chain 22, and between those entities and other entities outside supply chain 22, may be very complex. However, accurate modeling of these relationships and rules is usually critical for successful service parts inventory planning and management within system 10, as described more fully below.

Customers 16 may return service parts to the distributors 20 for replacement or repair as needed. These returned service parts may be processed through a "reverse logistics" or other returns supply chain 28 for eventual insertion back into supply chain 22. Typically, customer 16 will return service parts to the particular distribution center 24 from which the service parts were originally supplied. Similarly, distribution center 24 at a higher level in the supply chain 22 may return service parts to the distribution center 24 at a lower level from which the service parts were originally supplied. The returned service parts thus typically flow backward within the returns supply chain 28 from customer 16 through one or more distribution centers 24. Some returned service parts may be assemblies which include multiple components and may be dismantled to yield multiple returned service parts.

If a returned service part is still considered "good" or otherwise appropriate for immediate sale or use, the service part may be reinserted into the supply chain 22 at an appropriate point. This might be the case where, for example, the service part was mis-ordered by service personnel. Where a returned service part requires repair, however, it flows backward through supply chain 22 to a suitable repair center 30. While repair centers 30 are typically associated with suppliers 26, the present invention contemplates repair of returned service parts occurring at any suitable location. Although a particular flow of returned service parts is described, the present invention contemplates any other suitable flow. For example, returned service parts may bypass one or more distribution centers 24 in travelling to repair center 30. As another example, service parts may be inspected at suitable points in the supply chain 22 and, if needing repair, inserted into returns supply chain 28 without progressing further within supply chain 22. Once the service parts are repaired, they may be reinserted into supply chain 22.

Since a primary objective is to minimize new purchases of service parts, supply chain 22 typically depends heavily on the flow of returned service parts through returns supply chain 28. Accordingly, for effective inventory planning and management, flows within both supply chain 22 and returns supply chain 28 must be accurately modeled. However, this is typically a complex task. As merely examples of the type of factors which may need to be considered in modeling supply chain 12, including interactions between returns supply chain 28 and "forward" supply chains such as customer supply chain 18 and distributor supply chain 22, these factors and possibly many others may contribute to the complexity of the task in certain cases: (1) since certain customers 16 may demand "new" service parts rather than repaired "like new" service parts, a portion of service parts inventory must be truly "new" rather than merely repaired; (2) certain service parts may only be repaired a certain number of times, such that serial number tracking of services parts may be necessary; (3) estimated cycle times associated with each stage of returns supply chain 28 and each repair operation associated with repair center 30 may be critical in estimating and scheduling availability of repaired service parts; (4) "good" returns (e.g., mis-ordered rather than defective service parts) may or may not require inspection, testing, repackaging, or other operations, any of which may increase cycle time to the returns process; (5) for various reasons, a certain portion of returned service parts will not complete the returns process, instead being scrapped or otherwise condemned; (6) repairable service parts may remain in a pending status until actual or projected demand justifies moving them to an actual "work-in-progress" (WIP) stage of the repair process; (7) various reverse logistics processes (inspection, pending, WIP) may reside at different locations; (8) service parts may in some cases need to be repaired to different version levels, for example, where it is more cost effective to do a repair upgrade than to order a new service part; (9) particularly in some industries, the demand for new service parts must be satisfied before the demand for repaired service parts, such that repairable service parts might only be processed when little or no new service parts are in the queue or when repair becomes urgent; (10) a certain portion of service parts demand may be for service parts to replace parts originally built-to-order (BTO) as opposed to built-to-stock (BTS); (11) service parts demand cannot usually be met using conventional ATP principles; and (12) demand forecasts may be based on a view of supply chain 12 whereby demand trapped at lower levels in supply chain 22 is rolled up to higher levels, at which the rolled up demand must be added to independent demand that exists. As noted above, these factors are merely intended as examples to illustrate complexities of the problem which the present invention preferably takes into account in providing service parts inventory planning and management.

To drive the inventory of service parts within supply chain 12, customer 16 must typically create both short term and long term demand forecasts for service parts based on data concerning the lifespan of products and their constituent parts, failure rates of products and their constituent parts, and any other suitable information. As described more fully below, the marketplace 14 may support one or more services that perform such demand forecasting and, based on this information, determine which service parts should be inventoried, determine optimal locations at which the service parts should be inventoried, determine optimal inventory levels for the service parts at each stocking location, determine optimal allocations of the service parts between various customers, schedule service activities in coordination with service parts availability, and make any other appropriate decisions. One or more of these decision-making processes may be referred to as service budget optimization (SBO). In addition to identifying the service parts inventory excesses and needs within some or all of supply chain 12, marketplace 14 may also support services that allow such excesses and needs to be resolved. The services available through marketplace 14 are described more fully below.

Figure 2:
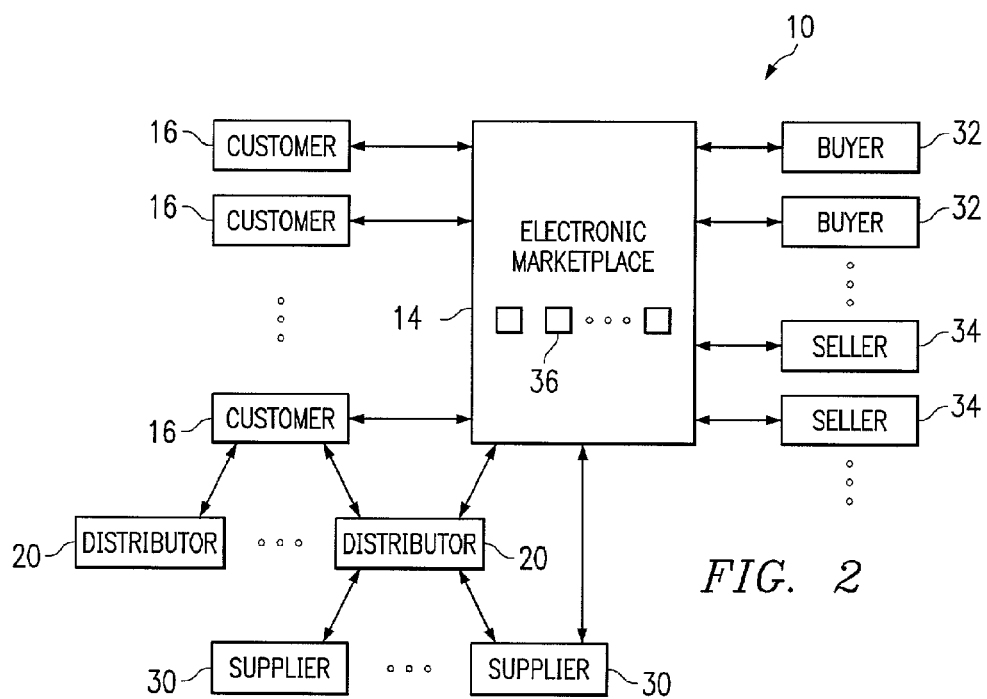
FIG. 2 illustrates a system including an electronic marketplace and a set of exemplary marketplace participants.

FIG. 2 more fully illustrates the entities associated with the marketplace 14 and their relationships. Some or all customers 16, distributors 20, and suppliers 26 may be coupled to the marketplace 14 using associated links, which may be any appropriate wireline, wireless, or other communications links. For example, each link may include one or more local area networks (LANs), metropolitan area networks (MANs), wide area networks (WANs), a global computer network such as the Internet, or another suitable network or networks. Although the customers 16, distributors 20, and suppliers 26 are described as being separate enterprises, the present invention contemplates any of these entities being wholly or partially integrated with any other of these entities in terms of business operations, supply chains, the processing of returned service parts, or in any other suitable manner according to particular needs. These entities may be referred to collectively, if appropriate, as marketplace participants. Marketplace participants may include any of the entities described above and, even more generally, may include any individuals, enterprises, or other entities that interact with marketplace 14 in connection with hosted services and associated commercial transactions. In one embodiment, for example, in addition to entities such as customers 16, distributors 20, and suppliers 26 that may rely on hosted inventory planning and management services, the participants may include entities such as buyers 32 and sellers 34 that do not use the planning and management capabilities of marketplace 14 but still participate in resulting commercial transactions with each other and with the entities described above. Marketplace 14 is preferably associated with an impartial individual, enterprise, or other entity suitable to manage the activities of marketplace 14 and to interact with participants.

The participants may communicate with marketplace 14 and with one another according to a hub-and-spoke, peer-to-peer, or any other suitable architecture. In one embodiment, the marketplace 14 is implemented using a hub-and-spoke architecture in which the spokes are suitably integrated with the enterprise systems of the participants and allow schedule-based data transfer between the enterprise systems and marketplace 14. Data transfer between participants and the marketplace 14 is described more fully below with reference to FIG. 3.

Marketplace 14 and its associated participants are each associated with one or more computers at one or more locations. Reference herein to marketplace 14 or to its participants is meant to include reference to one or more associated users, one or more suitable software components operating on associated computers, or any combination of users and software components suitable to perform activities in connection with hosted services and commercial transactions made available through the marketplace 14. The computers may include appropriate input devices, output devices, mass storage media, processors, memory, and any other components for receiving, processing, storing, and communicating information according to operation of system 10. As used herein, the term "computer" is intended to encompass a personal computer, workstation, network computer, wireless data port, wireless telephone, personal digital assistant, or any other suitable processing device. Participants may share one or more computer, data storage, communications, or other resources with the marketplace 14 or with one or more other participants where appropriate.

In a particular embodiment, marketplace 14 may be coupled to a marketplace-to-marketplace ("M2M") transaction services network through which the hosted services associated with the marketplace 14 are made available to participants interacting with other marketplaces coupled to the M2M transaction services network. As an example, copending U.S. application Ser. No. 09/679,464 describes techniques for brokering services among marketplaces using a service transaction broker.

As described more fully below, marketplace 14 supports one or more processes 36 each providing one or more corresponding hosted services available to marketplace participants according to the operation of system 10. The software used to provide the operational functionality for such services is preferably readily extendible to allow for additional services that enhance or replace those offered in an initial implementation of system 10. Although a single service of each type may be described below, the present invention contemplates any number of services of each type being available to support marketplace participants. Marketplace 14 may partner with one or more third parties, if appropriate, to provide these or other services. In one embodiment, as described above, marketplace 14 provides its participants with access to hosted services and associated commercial transactions relating to service parts.

Figure 3:
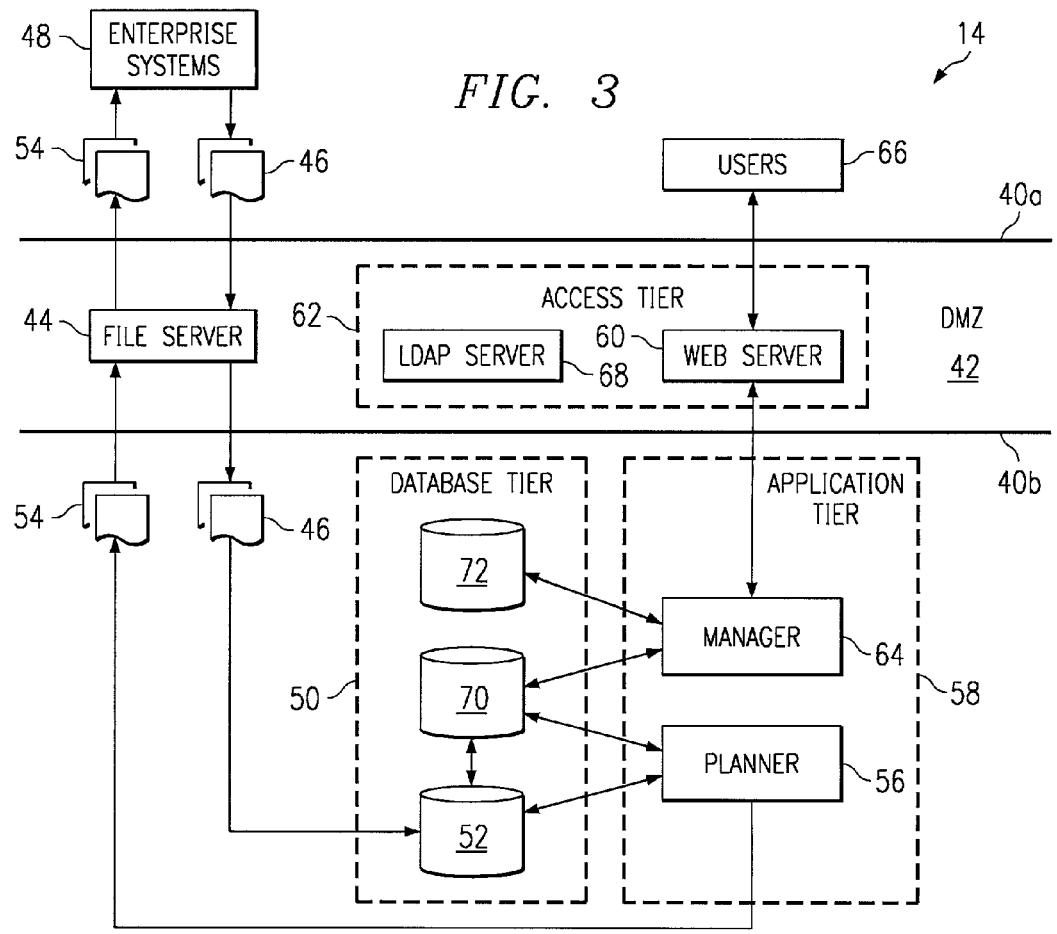
FIG. 3 illustrates an exemplary electronic marketplace in more detail.

FIG. 3 illustrates an exemplary marketplace 14 in more detail. Marketplace 14 may include one or more firewalls 40 establishing a "DMZ" or other region 42 that separates participants from the more critical processing and data storage resources of marketplace 14. In one embodiment, DMZ 42 isolates a file transfer protocol (FTP) or other file server 44 that receives data files 46 or other information from the enterprise systems 48 of participants. File server 44 communicates the data files 46 to a database tier 50 of the marketplace 14 for storage in database 52 in flatfile format or otherwise. File server 44 also receives planning output 54 from one or more appropriate planner applications 56 within an application tier 58 of the marketplace 14. The file server 44 communicates the planning output 54 to the enterprise systems 48 of the participants. DMZ 42 also isolates one or more web servers 60 in an access tier 62, which may communicate between manager application 64 in application tier 58 and one or more users 66 associated with participants. For example, web server 60 may communicate information to these users 66 using Hypertext Markup Language (HTML), Extensible Markup Language (XML), or other documents contained in Secure Hypertext Transfer Protocol (S-HTTP) requests.

As described above, the firewalls 40 provide security and authentication for the environment of marketplace 14. In one embodiment, in response to an access request from a participant, external firewall 40a determines whether the participant should be allowed access to marketplace 14 generally based on a username, password, and other suitable logon information contained in the request. Firewall software 40b may then validate this logon information against a lightweight directory access protocol (LDAP) or other directory server 68 and an associated directory to determine which applications within the marketplace 14 the participant is permitted to access. Application access is preferably restricted at the screen level, for example, such that a customized view of the services the participant is entitled to use—and preferably only those services—may be provided. For example, planning services may be private for each participant because they may involve internal confidential operations of associated supply chain 12. Other services, such as an indirect procurement service, may be public services that are made accessible to all participants. The directory server 68 preferably maintains and verifies session and state data throughout the session to minimize directory lookups while still preventing unauthorized access to portions of the marketplace environment.

In one embodiment, the manager application 64 is responsible for managing the flow of data to, from, and within the marketplace 14 in connection with various service parts inventory planning and management activities. Based on planning information it receives from planner applications 56, reflecting service parts inventory planning and management information associated with one or more participants, manager application 64 may initiate one or more suitable hosted services. Particular planner applications 56 are described more fully below with reference to FIG. 4. In general, the planner applications 56 generate planning information for at least a portion of supply chain 12 based on the data files 26 received from enterprise systems 48 and other appropriate information. Planner applications 56 may interact with the database 52 or, for certain tasks, with an active data warehouse (ADW) 70 in which the information contained in data files 46 is stored and routinely updated. Although described as being an ADW, ADW 70 may be any suitable data storage arrangement. Manager application 64 may also have access to ADW 70 if appropriate. In addition, as described more fully below with reference to FIG. 4, manager application 64 may access information stored in database 72 in connection with one or more services initiated to resolve service parts inventory excesses or needs. Although database 52, ADW 70, and database 72 may be described as separate, the present invention contemplates these storage locations being wholly or partially integrated according to particular needs.

Figure 4:
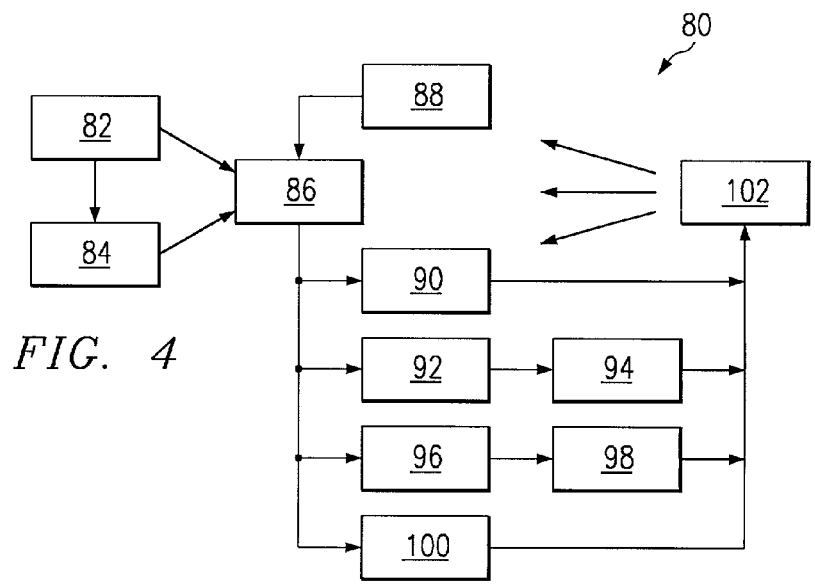
FIG. 4 illustrates an exemplary functional architecture that is associated with an electronic marketplace.

FIG. 4 illustrates an exemplary functional architecture 80 including various functions associated with the marketplace 14. Although described as being separate, a function might be wholly or partially integrated, within software or otherwise, with one or more other functions. The illustrated functions are described below in the context of an overall planning workflow for service parts planning and inventory management. In general, this workflow is designed to be a recurring closed-loop process in which the enterprise is continually planning and re-planning in order to adjust to fluctuations in service parts demand and supply while satisfying its target customer service levels. As the pertinent time window advances, the enterprise must keep its short term and long term plans current to achieve and maintain the forward visibility necessary to provide proper customer care.

An appropriate place to begin describing this process is with forecast planning function 82. This is typically a critical step in the overall process, since it provides a view of expected demand for service parts and associated service requests. Demand forecasts may be provided according to product, geography, time, or other dimensions. The demand forecasting exercise should preferably extend from a granular short term horizon to a more aggregated long term horizon. It might be desirable to engage in collaborative demand planning with certain key trading partners to better estimate the demand for service parts. As an example, a customer 16 may collaborate with one or more primary distributors 20, while a distributor 20 may collaborate with one or more primary suppliers 30. At the end of the forecasting cycle, a demand forecast may be generated and communicated to a long term strategic planning function such as SBO function 84 and to a short term tactical planning function such as service parts planning function 86.

SBO function 84 is typically implemented in a planning engine that determines optimal service parts inventory plans according to long term demand forecasts, service budget constraints, and other appropriate information. In essence, the SBO function 84 determines how the enterprise should optimally deploy its service parts budget within supply chain 12. Output from the SBO function 84 is communicated to service parts planning function 86, where it is used along with the demand forecasts from forecast planning function 82 to determine the optimal service parts inventory plan for supply chain 12, including at least stocking targets at one or more stocking locations within supply chain 12.

In one embodiment, service parts planning function 86 considers various aspects of the supply chain 12, including but not limited to manufacturing capacities at one or suppliers 30, existing inventories and other information concerning distribution centers 24 within distributor supply chain 22, existing inventories within customer supply chain 18, service parts flow through the returns supply chain 28, customer commitments and allocations, target customer service levels, or any other suitable information. Based on this information, planning function 86 determines an optimal inventory target for each stocking location within supply chain 12 to meet the upcoming forecasted demand. A repair center scheduling function 88 may monitor the flow of returned service parts in returns supply chain 28 and communicate appropriate information to planning function 86 such that planning function 86 may determine a net supply signal for service parts within supply chain 12.

According to the inventory plan, the planning function 86 identifies any excess inventory that currently exists or is expected to exist at one or more stocking locations within the supply chain 12 relative to the desired inventory targets. This excess can be transferred to one or more other stocking locations within the supply chain 12 based on the inventory plan or, as is described more fully below, disposed of using one or more services available through a broker function 90. Similarly, according to the inventory plan, planning function 86 determines the net inventory needs at one or more stocking location in the supply chain 12. The needs may be satisfied through transfers from one or more other stocking location within supply chain 12 according to the inventory plan, through collaboration with one or more participants using a procurement collaboration function 92 and associated procurement execution function 94, or using one or more services available through the broker function 90. The inventory plan is stored in the ADW 70 or otherwise, where it may be accessible to one or more entities in the supply chain 12, for example, entities associated with stocking locations at which service parts excesses or needs are to be resolved according to the inventory plan. A display which reflects some or all of the inventory plan may also be provided to a user 66 associated with the participant for which the inventory plan was generated, allowing user 66 to interact with marketplace 14 as appropriate in view of the inventory plan.

A procurement collaboration function 92 enables the customer 16 to collaborate with distributors 20, suppliers 30, or any other participants to obtain appropriate service parts commitments, which may then be communicated back to planning function 86 as scheduled receipts. For example, a customer 16 may have the ability to view service parts needs by time period and in association with a list of external suppliers that may have the ability to satisfy those needs. Customer 16 may select the service parts that customer 16 wishes to collaborate on and submits a request for the service parts. The request is communicated to the corresponding suppliers through the marketplace 14, the suppliers respond to the request with promises, and customer 16 accepts or rejects the promises as the customer 16 deems appropriate. Procurement collaboration function 92 sends information reflecting the collaboration, typically including at least agreed upon quantities, prices, and delivery dates, to procurement execution function 94, which may essentially act as a purchase order (PO) generation engine. The procurement execution function 94 generates POs for the appropriate service parts, enqueues these POs for an approval process if necessary, and communicates the approved POs to the appropriate suppliers using the marketplace 14 or otherwise. In the case of indirect procurement, there may be a lack of collaboration, such that needs are communicated from planning function 86 directly to the procurement execution function 94 and the suppliers which receive POs may not be expecting to receive these POs. The described procurement scenario is intended to be an example; the present invention contemplates procurement collaboration occurring in any appropriate manner.

Once it determines the optimal inventory plan, planning function 86 may also send the inventory plan to allocation planning function 96, which determines suitable allocations of the constrained service parts supply to customers of the participant for which planning is being performed. For example, where the marketplace 14 performs planning for customer 16, the allocations are determined for the customers of customer 16, such as retail consumers. In the alternative, where the planning is being performed for a distributor 20, the allocations are determined for those customers 16 that rely on service parts supplied from distributor 20. In one embodiment, service parts allocations are made according to customer agreements, customer priorities, and other appropriate business rules. For example, the participant may be obligated to provide a certain level of service to certain of its customers based on existing service agreements. As another example, the participant may wish to impress certain customers in hopes of obtaining future purchase volume increases, reward certain customers for past purchase volumes, or otherwise set aside service parts for certain customers. Through a proper allocation scheme, the participant is ensured that higher priority customers are able to obtain the service parts they need when they need them. The present invention contemplates the allocation being made according to any suitable business rules. In one embodiment allocation planning function 96 may rely on a demand fulfillment function 98 which enables intelligent allocation of unconstrained supply, often referred to as ATP, among customers of the participant in addition to allocation of the constrained supply as was described above.

Planning function 86 may also send the inventory plan to a service scheduling function 100, which coordinates service parts requirements with service requests being handled through a customer care front end. For example, in a typical case, a customer might file an incident report requiring on-site support through the customer care front end. Scheduling function 100 processes this service request and preferably provides a promise date to the customer, taking into account the pool of field engineers or other support personnel appropriate to handle the service request. Scheduling function 100 may obtain this information from a service execution monitoring function (not shown), from customer care front end, or from any other suitable source. Scheduling function 100 schedules the service request consistent with the promise to the customer and, in response, one or more field engineers or other support personnel are assigned to handle the service request. In one embodiment, scheduling function 100 may schedule regular, triggered, or other preventive maintenance service requests in a similar manner.

Scheduling function 100 is preferably also responsible for coordinating with the service request any service parts necessary in connection with the service request, based on available service parts supply reflected in the inventory plan received from planning function 86. As an example, the scheduling function 100 may ensure that all necessary service parts are available at the customer site on or before the promised service date. Accordingly, the promise is preferably generated based on the availability of necessary service parts in addition to the availability of suitable support personnel. Scheduling function 100 may consider appropriate business rules in allocating the service parts and support personnel to customer sites in a manner analogous to that described above in connection with allocation planning function 86. Scheduling function 100 preferably publishes an overall schedule, including the schedules for service parts and for support personnel, to the service execution monitoring function, the customer care front end, or another suitable destination.

As described above, manager application 64 may initiate one or more suitable services through a broker function 90 in response to the inventory plan from planning function 86 indicating service parts excesses or needs in the supply chain 12. Services available to manager application 64 may be identified in a database 72, which manager application 64 accesses to determine which of the services to initiate, in which order to initiate the services, and information pertaining to the services. In one embodiment, for service parts needs, the manager application 64 may initiate services to facilitate one or more of the following, without limitation: (1) purchase some or all needed service parts from one or more other participants through a bid/ask exchange; (2) initiate one or more reverse auctions to purchase some or all needed service parts from one or more other participants; and (3) purchase some or all needed service parts from one or more other participants based on associated excess inventory listings.

For example only and without limitation, an aircraft service parts distributor 20 that supplies service parts to airline customers 16 might find itself with service parts needs at one or more stocking locations, according to the inventory plan generated at planning function 86. In response, manager application 64 might initiate one or more services, automatically or in response to input from distributor 20, to attempt to obtain the needed service parts. An inventory listing service (ILS) might list aircraft parts by serial number, time since new, time since overhaul, whether life limited or not, FAA certification, and other suitable attributes. Once the service is initiated, distributor 20 may search for the needed service parts, locate these service parts, and place a bid for these service parts. If traceability of these service parts is important, then traceability documents might be provided with the service part representation or the participants might conclude the transaction contingent on proper documents being furnished. After manager application 64 initiates a service, broker function 90 may be responsible for managing actual operation of the service. Broker function 90 may enforce any typical, proprietary, or other suitable rules associated with bid/ask exchanges, reverse auctions, and inventory listings in managing operation of these services.

For service parts excesses, the manager application 64 might initiate services to perform one or more of the following, without limitation: (1) sell some or all of these excess service parts to one or more other participants through a bid/ask exchange; (2) initiate one or more auctions to sell some or all of these excess service parts to one or more other participants; and (3) post some or all of these excess service parts on an excess inventory listing for sale to one or more other participants. As an example, the aircraft service parts distributor 20 described above might find itself with service parts excesses at one or more stocking locations, based on the inventory plan generated at planning function 86. In response, manager application 64 might initiate one or more services described above, automatically or in response to input from distributor 20, to attempt to sell the excess service parts.

While only a single buyer or a single seller may be described in relation to a particular hosted service, those of skill in the art will readily appreciate that the present invention is intended to encompass cases involving any number of buyers and sellers, according to particular needs. A buyer for purposes of one service may be a seller as to one or more other services of the same or different type, and vice versa. A buyer or a seller may uses two or more services simultaneously, with the same or a different seller or buyer, respectively.

Following or in connection with execution at broker function 90, procurement execution function 94, demand fulfillment function 98, or scheduling function 100, an order management function 102 may receive information appropriate to allow the order management function 102 to maintain order histories and monitor order status; monitor payments, accounts payable, and accounts receivable information; monitor processing of returns and exchanges; and otherwise manage to completion the numerous commercial transactions associated with marketplace 14. Order management function 102 may feed information back to other functions as appropriate.

Figure 5:
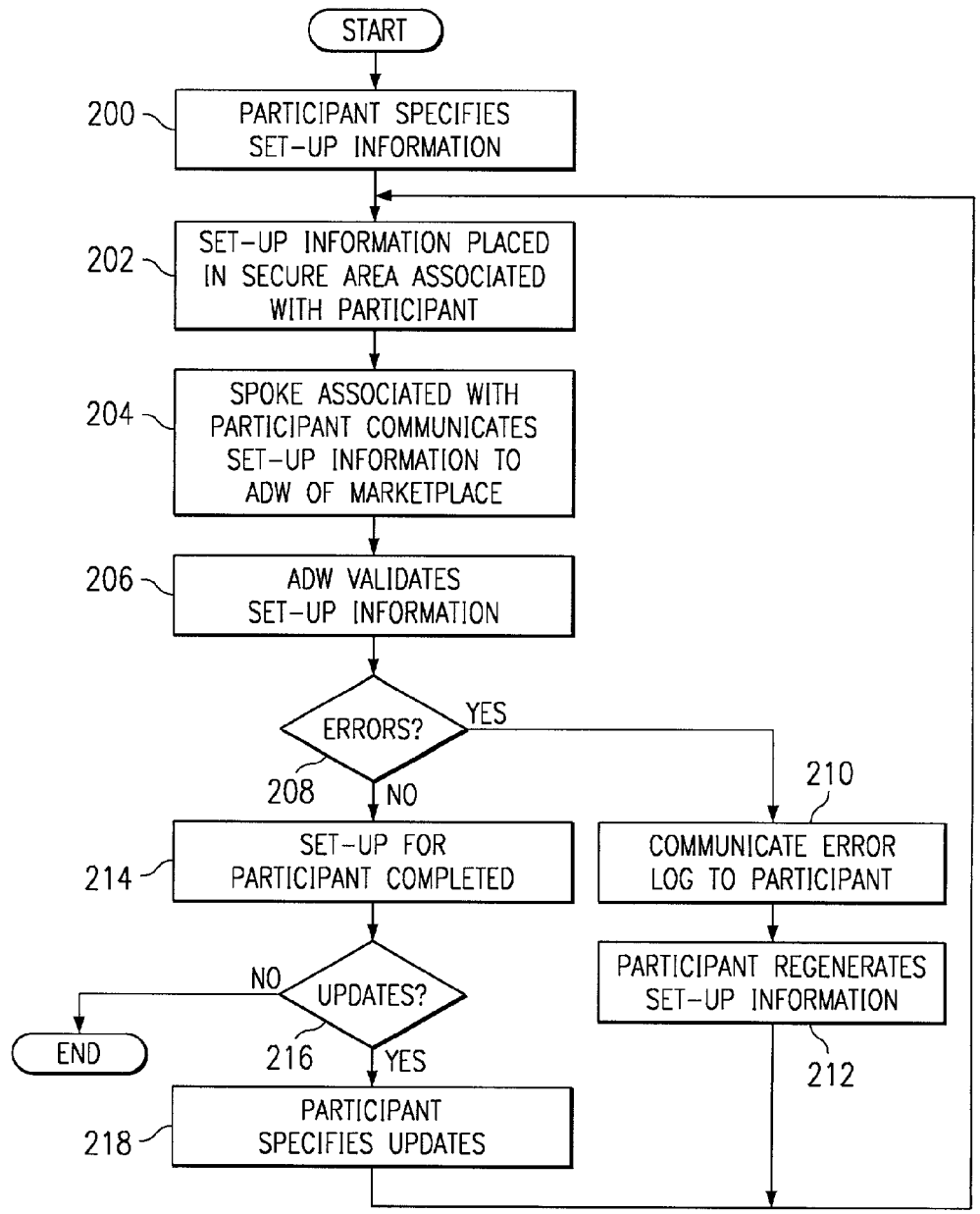
FIG. 5 illustrates an exemplary method of providing set-up information to a marketplace to facilitate service parts inventory planning and management.

FIG. 5 illustrates an exemplary method of setting up system 10 to support service parts inventory planning and management for supply chain 12 on behalf of a participant. The method begins at step 200, where the participant specifies suitable set-up information relating to the participant, relationships and rules governing interaction with other members of supply chain 12, business rules relating to customer allocations and the like, and any other suitable set-up information which may be useful to one or more functions described above with reference to FIG. 4. At step 202, the set-up information for the participant is placed in a specified data storage location associated with the participant, such as behind firewalls 40 that secure this information against unauthorized access. In a particular embodiment, at step 204, the spoke associated with the participant picks up the set-up information and communicates it over the Internet or otherwise to ADW 70 of marketplace 14. A user 66 may assist in communicating set-up information to the marketplace 14, particularly the first time such set-up information is communicated for the particular participant. Thereafter, updated set-up information may be communicated by the spoke from the participant to marketplace 14 on a routine or other basis, preferably automatically.

At step 206, ADW 50 may validate one or more suitable aspects of the set-up information. If errors exist at step 208, an error log is created and communicated to the participant at step 210. In one embodiment, the error log is placed in a specified data storage location associated with the participant, such as behind firewalls 40 that secure this information against any unauthorized access. At step 212, the participant or one or more associated users 66 access the error log, make appropriate corrections, and then regenerate some or all of the set-up information for the participant. The method then returns to step 202. If no errors exist at step 208, then the set-up is complete for the participant at step 214.

If updates to the set-up information are warranted at step 216, the participant or associated user 66 specifies the updates at step 218 and the method then returns to step 202. The present invention contemplates updating set-up information for a participant periodically, according to any suitable schedule, as long as the participant is associated with the marketplace 14. If the participant disassociates from the marketplace 14 such that no updates occur at step 216, the method ends. The present invention contemplates the method being performed similarly for all participants that either use marketplace 14 for service parts inventory planning and management or which provide information to marketplace 14 in connection with service parts inventory planning and management performed on behalf of another participant.

Figure 6:
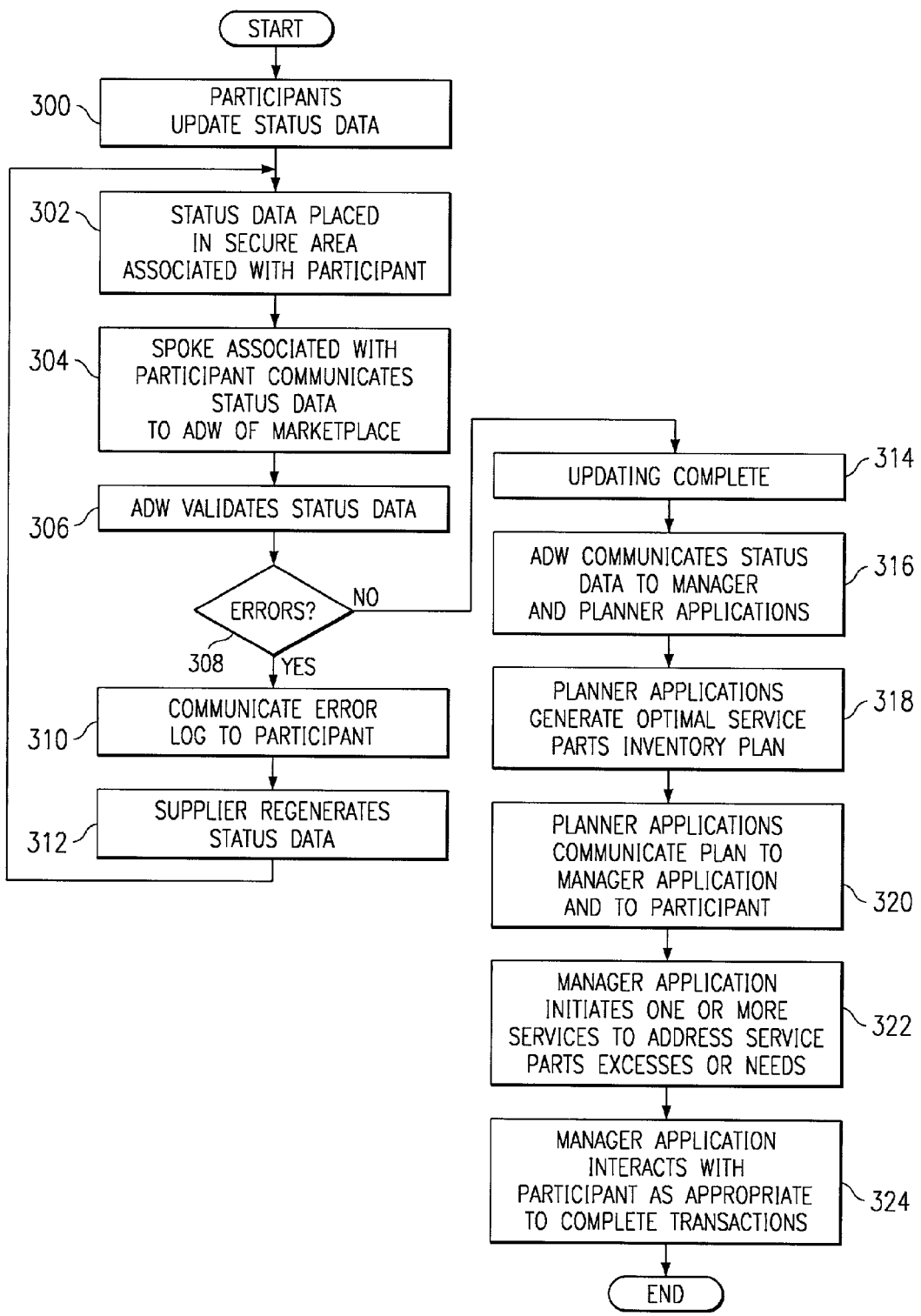
FIG. 6 illustrates an exemplary method for providing service parts inventory planning and management.

FIG. 6 illustrates an exemplary method of providing service parts inventory planning and management using the resources of marketplace 14. The method begins at step 300, where one or more suitable participants may update information concerning current inventories, commitments, returns, or other suitable status data using associated enterprise systems 28. These updates preferably occur on a regularly scheduled basis, serially, substantially simultaneously, or in any other manner. In one embodiment, all participants update associated status data according to a predetermined schedule that is designed to help ensure that the marketplace 14 is not operating on stale data while not imposing an unduly large burden on enterprise systems 28, users 66, or other aspects of participant environments.

At step 302, the status data for each participant is placed in a specified data storage location associated with supplier 12, such as behind firewalls 40 which protect the information against unauthorized access. In one embodiment, at step 304, spokes associated with these participants pick up the status data and communicate it over the Internet or otherwise to ADW 50 of the marketplace 14. Although regularly scheduled automatic communication of status data is preferred, one or more users 66 may assist with communication of the status data to marketplace 14 as appropriate. At step 306, ADW 50 may validate one or more appropriate aspects of the status data. If errors exist at step 308, an error log is generated and communicated to the associated participant at step 310. In one embodiment, the error log is placed in a specified data storage location associated with supplier 12, such as behind firewalls 40 which secure the information from unauthorized access. At step 312, the participant or an associated user 66 accesses the error log, makes suitable corrections, and regenerates some or all set-up information for the participant. The method then returns to step 302. If no errors exist at step 208, then updating of the status data is complete for the participant at step 314.

At step 316, ADW 50 communicates the status data for one or more participants to appropriate planner applications 56 and, possibly, to manager application 64. Based on the status data and an appropriate model for at least a portion of the supply chain 12, the planner applications 56 generate an updated optimal service parts inventory plan at step 318. In one embodiment, as is described above with reference to FIG. 4, this may involve cooperative execution of forecast planning function 82, SBO function 84, and service parts planning function 86. However, the output from the forecast planning function 82 and the SBO function 84 will typically be generated less frequently than service parts inventory plans and may therefore be stored in the ADW 70 or elsewhere until needed for the service parts planning function 88. Also as described more fully above, the inventory plan will include at least optimal stocking targets for one or more stocking locations in the supply chain 12. Planner applications 44 communicates the updated service parts inventory plan to manager application 44 and preferably also to enterprise systems 28 of the participant through ADW 70 at step 320.

In response, at step 322, manager application 44 initiates one or more suitable services in an effort to address any service parts excesses or needs within supply chain 12. Manager application 44 may operate subject to input from user 66 associated with the participant or may initiate one or more services automatically. Exemplary services hosted at marketplace 14 and suitable for this task are described more fully above with reference to FIG. 3. In one embodiment, this task may include execution of the broker function 90, procurement collaboration function 92, allocation planning function 96, or service scheduling function 100, singly or in any suitable combination. At step 324, the manager application 44 interacts with one or more participants, the associated enterprise systems 28, or associated users 66 as is appropriate to complete transactions initiated as a result of these services initiated at step 322. The method may iterate in whole or in part until service parts stocking levels at one or more stocking locations within the supply chain 12 are consistent with the optimal service parts inventory plan. Once the stocking levels are acceptable in view of the plan, and service parts excesses and needs have been adequately resolved, the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A non-transitory computer-readable storage medium embodied with software providing service parts inventory planning and management for one or more entities in a supply chain, the software when executed by a computer is configured to:

receive set-up data for the one or more entities;

validate one or more aspects of the set-up data and if one or more errors exist, create an error log that is accessible by the one or more entities;

receive status data reflecting substantially current service parts inventory levels at one or more stocking locations in a supply chain, the inventory levels indicating service parts excesses or needs at one or more of the stocking locations;

access a service parts demand forecast for the supply chain;

access a model of the supply chain;

access reverse logistics data comprising a forecast of service parts returns flow into a returns supply chain within the supply chain, an estimate of repairable service parts returns as a percentage of all service parts returns, an estimate of repair times for the repairable service parts returns, and a model of the returns supply chain;

generate a substantially current service parts inventory plan according to the status data, the demand forecast, and the model, the service parts inventory plan comprising target stocking levels for service parts at one or more stocking locations in the supply chain;

generate an updated service parts inventory plan based on the reinsertion of one or more repaired service parts reinserted back into the supply chain; and according to the service parts inventory plan, automatically and independent of human interaction in response to receiving the service parts inventory plan, executing a broker function to resolve the service parts excesses or needs at one or more of the stocking locations through interaction with one or more other entities in the supply chain.

2. The computer-readable storage medium of claim 1, wherein any customer requirements for totally new service parts as opposed to repaired service parts are considered in generating the service parts inventory plan.

3. The computer-readable storage medium of claim 1, wherein the software is further configured to schedule a service task according to projected availability of one or more service parts necessary in connection with the service operation as reflected in the service parts inventory plan.

4. The computer-readable storage medium of claim 3, wherein the software is further configured to schedule the service task by scheduling service personnel necessary to perform the service task.

5. The computer-readable storage medium of claim 1, wherein the software is further configured to receive status data for all the stocking locations in the supply chain, the service parts inventory plan comprising target stocking levels for all the stocking locations in the supply chain.

6. The computer-readable storage medium of claim 1, wherein the service parts inventory plan further comprises an optimal allocation of service parts to one or more customers to meet target customer service levels.

7. The computer-readable storage medium of claim 1, wherein the software is further configured to generate updated service parts inventory plans according to fluctuations in service parts demand and supply within the supply chain and according to target customer service levels.

8. The computer-readable storage medium of claim 1, wherein the software is further configured to make the service parts inventory plan accessible to one or more entities associated with the stocking locations at which service parts excesses or needs exist for use in transferring service parts between the stocking locations to satisfy the service parts inventory plan.

9. The computer-readable storage medium of claim 1, wherein the software is further configured to, automatically and independent of human interaction in response to receiving the service parts inventory plan, initiate a service to transfer service parts from a first stocking location with service parts excesses according to the service parts inventory plan to a second stocking location with service parts needs according to the service parts inventory plan.

10. The computer-readable storage medium of claim 1, wherein the software is further configured to, initiate one or more services to resolve the service parts excesses or needs, the one or more services selected from the group consisting of:

sell service parts to another entity through a bid/ask exchange;

purchase service parts from another entity through a bid/ask exchange;

sell service parts to another entity in an auction;

purchase service parts from another entity in a reverse auction;

post service parts in an inventory listing service for sale to another entity; and purchase service parts posted in an inventory listing service by another entity.

11. The computer-readable storage medium of claim 1, wherein the software is further configured to, automatically and independent of human interaction in response to receiving the service parts inventory plan, initiate multiple services to resolve the service parts excesses or needs, a first service initiated for a first portion of the service parts excesses or needs, and a second service initiated for a second portion of the service parts excesses or needs.

12. The computer-readable storage medium of claim 10, wherein the software is further configured to host the one or more services initiated automatically and independent of human interaction in response to receiving the service parts inventory plan, at an electronic marketplace.

13. A system for providing service parts inventory planning and management for one or more entities in a supply chain, comprising:

one or more planner applications tangibly embodied on a computer-readable storage medium configured to:

receive set-up data for the one or more entities;

validate one or more aspects of the set-up data and if one or more errors exist, create an error log that is accessible by the one or more entities;

receive status data reflecting substantially current service parts inventory levels at one or more stocking locations in a supply chain, the inventory levels indicating service parts excesses or needs at one or more of the stocking locations;

access a service parts demand forecast for the supply chain;

access a model of the supply chain;

access reverse logistics data comprising a forecast of service parts returns flow into a returns supply chain within the supply chain, an estimate of repairable service parts returns as a percentage of all service parts returns, an estimate of repair times for the repairable service parts returns, and a model of the returns supply chain;

generate a service parts inventory plan according to the status data, the demand forecast, the model, the reverse logistics data, and one or more customer service target levels, the service parts inventory plan comprising target stocking levels for service parts at one or more stocking locations in the supply chain; and generate an updated service parts inventory plan based on the reinsertion of one or more repaired service parts reinserted back into the supply chain; and a manager application tangibly embodied on a computer-readable storage medium configured to receive the service parts inventory plan and, according to the service parts inventory plan, automatically and independent of human interaction in response to receiving the service parts inventory plan, execute a broker function to resolve the service parts excesses or needs at one or more of the stocking locations through interaction with one or more other entities in the supply chain.

14. The system of claim 13, wherein the one or more planner applications are further configured to, automatically and independent of human interaction in response to receiving the service parts inventory plan, schedule a service operation according to the projected availability of one or more service parts necessary in connection with the service operation as reflected in the service parts inventory plan.

15. The system of claim 13, wherein the broker function initiates one or more services to resolve the service parts excesses or needs, the one or more services selected from the group consisting of:
sell service parts to another entity through a bid/ask exchange;
purchase service parts from another entity through a bid/ask exchange;
sell service parts to another entity in an auction;
purchase service parts from another entity in a reverse auction;
post service parts in an inventory listing service for sale to another entity; and
purchase service parts posted in an inventory listing service by another entity.

16. The system of claim 13, wherein the one or more planner applications are configured to consider any customer requirements for totally new service parts as opposed to repaired service parts in generating the service parts inventory plan.

17. The system of claim 13, wherein the one or more planner applications are configured to schedule a service operation according to the projected availability of one or more service parts necessary in connection with the service operation as reflected in the service parts inventory plan.

18. The system of claim 17, wherein scheduling a service operation comprises scheduling service personnel necessary to perform the service operation.

19. The system of claim 13, wherein the one or more planner applications are configured to receive status data for all the stocking locations in the supply chain and the service parts inventory plan comprises target stocking levels for all the stocking locations in the supply chain.

20. The system of claim 13, wherein the service parts inventory plan further comprises an optimal allocation of service parts to one or more customers to meet target customer service levels.

21. The system of claim 13, wherein the one or more planner applications are configured to generate updated service parts inventory plans according to fluctuations in service parts demand and supply within the supply chain and according to target customer service levels.

22. The system of claim 13, wherein the service parts inventory plan is accessible to one or more entities associated with the stocking locations at which service parts excesses or needs exist for use in transferring service parts between stocking locations to satisfy the service parts inventory plan.

23. The system of claim 13, wherein the manager application is configured to, automatically and independent of human interaction in response to receiving the service parts inventory plan, initiate a service to transfer service parts from a first stocking location with service parts excesses according to the service parts inventory plan to a second stocking location with service parts needs according to the service parts inventory plan.

24. The system of claim 13, wherein the broker function initiates one or more services to resolve the service parts excesses or needs, the one or more services selected from the group consisting of:
sell service parts to another entity through a bid/ask exchange;
purchase service parts from another entity through a bid/ask exchange;
sell service parts to another entity in an auction;
purchase service parts from another entity in a reverse auction;
post service parts in an inventory listing service for sale to another entity; and
purchase service parts posted in an inventory listing service by another entity.

25. The system of claim 13, wherein the manager application is configured to, automatically and independent of human interaction in response to receiving the service parts inventory plan, initiate multiple services to resolve the service parts excesses or needs, a first service initiated for a first portion of the service parts excesses or needs, and a second service is initiated for a second portion of the service parts excesses or needs.

26. The system of claim 24, further comprising an electronic marketplace that supports the one or more planner applications and the manager application, the one or more services, initiated automatically and independent of human interaction in response to receiving the service parts inventory plan, hosted at the electronic marketplace.

27. A method of providing service parts inventory planning and management for one or more entities in a supply chain, comprising:
receiving, by a computer, set-up data for the one or more entities;
validating, by the computer, one or more aspects of the set-up data and if one or more errors exist, creating, by the computer, an error log that is accessible by the one or more entities;
receiving, by the computer, status data reflecting substantially current service parts inventory levels at one or more stocking locations within a supply chain, the inventory levels indicating service parts excesses or needs at one or more of the stocking locations;
accessing, by the computer, a service parts demand forecast for the supply chain;
accessing, by the computer, a model of the supply chain;
accessing, by the computer, reverse logistics data comprising a forecast of service parts returns flow into a returns supply chain within the supply chain, an estimate of repairable service parts returns as a percentage of all service parts returns, an estimate of repair times for the repairable service parts returns, and a model of the returns supply chain;
generating, by the computer, a service parts inventory plan according to the status data, the demand forecast, the model, the reverse logistics data, and one or more customer service target levels, the service parts inventory plan comprising target stocking levels for service parts at one or more stocking locations in the supply chain;
generating, by the computer, an updated service parts inventory [[plans]] plan based on the reinsertion of one or more repaired service parts reinserted back into the supply chain; and
according to the service parts inventory plan, automatically and independent of human interaction in response to receiving the service parts inventory plan, executing, by the computer, a broker function to resolve the service parts excesses or needs at one or more of the stocking locations through interaction with one or more other entities in the supply chain.

28. The method of claim 27, further comprising, automatically and independent of human interaction in response to receiving the service parts inventory plan, scheduling a service task according to projected availability of one or more service parts necessary in connection with the service task as reflected in the service parts inventory plan.

29. The method of claim 27, further comprising, initiating one or more services to resolve the service parts excesses or needs, the one or more services selected from the group consisting of:
   sell service parts to another entity through a bid/ask exchange;
   purchase service parts from another entity through a bid/ask exchange;
   sell service parts to another entity in an auction;
   purchase service parts from another entity in a reverse auction;
   post service parts in an inventory listing service for sale to another entity; and
   purchase service parts posted in an inventory listing service by another entity.
   receiving, by the computer, status data reflecting substantially current service parts inventory levels at one or more stocking locations within a supply chain, the inventory levels indicating service parts excesses or needs at one or more of the stocking locations;
   accessing, by the computer, a service parts demand forecast for the supply chain;
   accessing, by the computer, a model of the supply chain;
   accessing, by the computer, reverse logistics data comprising a forecast of service parts returns flow into a returns supply chain within the supply chain, an estimate of repairable service parts returns as a percentage of all service parts returns, an estimate of repair times for the repairable service parts returns, and a model of the returns supply chain;
   generating, by the computer, a service parts inventory plan according to the status data, the demand forecast, the model, the reverse logistics data, and one or more customer service target levels, the service parts inventory plan comprising target stocking levels for service parts at one or more stocking locations in the supply chain;
   generating, by the computer, an updated service parts inventory plan based on the reinsertion of one or more repaired service parts reinserted back into the supply chain; and
   according to the service parts inventory plan, automatically and independent of human interaction in response to receiving the service parts inventory plan, executing, by the computer, a broker function to resolve the service parts excesses or needs at one or more of the stocking locations through interaction with one or more other entities in the supply chain.

30. The method of claim 27, wherein any customer requirements for totally new service parts as opposed to repaired service parts are considered in generating the service parts inventory plan.

31. The method of claim 27, further comprising scheduling a service task according to projected availability of one or more service parts necessary in connection with the service operation as reflected in the service parts inventory plan.

32. The method of claim 31, wherein scheduling the service task comprises scheduling service personnel necessary to perform the service task.

33. The method of claim 27, further comprising receiving status data for all the stocking locations in the supply chain, the service parts inventory plan comprising target stocking levels for all the stocking locations in the supply chain.

34. The method of claim 27, wherein the service parts inventory plan further comprises an optimal allocation of service parts to one or more customers to meet target customer service levels.

35. The method of claim 27, further comprising generating updated service parts inventory plans according to fluctuations in service parts demand and supply within the supply chain and according to target customer service levels.

36. The method of claim 27, further comprising making the service parts inventory plan accessible to one or more entities associated with the stocking locations at which service parts excesses or needs exist for use in transferring service parts between the stocking locations to satisfy the service parts inventory plan.

37. The method of claim 27, further comprising, automatically and independent of human interaction in response to receiving the service parts inventory plan, initiating a service to transfer service parts from a first stocking location with service parts excesses according to the service parts inventory plan to a second stocking location with service parts needs according to the service parts inventory plan.

38. The method of claim 27, further comprising, initiating one or more services to resolve the service parts excesses or needs, the one or more services selected from the group consisting of:
   sell service parts to another entity through a bid/ask exchange;
   purchase service parts from another entity through a bid/ask exchange;
   sell service parts to another entity in an auction;
   purchase service parts from another entity in a reverse auction;
   post service parts in an inventory listing service for sale to another entity; and
   purchase service parts posted in an inventory listing service by another entity.

39. The method of claim 27, further comprising, automatically and independent of human interaction in response to receiving the service parts inventory plan, initiating multiple services to resolve the service parts excesses or needs, a first service initiated for a first portion of the service parts excesses or needs, and a second service initiated for a second portion of the service parts excesses or needs.

40. The method of claim 38, further comprising hosting the one or more services, initiated automatically and independent of human interaction in response to receiving the service parts inventory plan, at an electronic marketplace.

* * * * *

UNITED STATES PATENT AND TRADEMARK OFFICE
CERTIFICATE OF CORRECTION

PATENT NO. : 7,881,985 B2  Page 1 of 1
APPLICATION NO. : 09/791481
DATED : February 1, 2011
INVENTOR(S) : Hong M. Yang et al.

It is certified that error appears in the above-identified patent and that said Letters Patent is hereby corrected as shown below:

Col. 19, Lines 4-52
Replace Claim 29 with the following:

29. The method of Claim 27, further comprising, initiating one or more services to resolve at least a portion of the service parts excesses or needs, the one or more services selected from the group consisting of:
    sell service parts to another entity through a bid/ask exchange;
    purchase service parts from another entity through a bid/ask exchange;
    sell service parts to another entity in an auction;
    purchase service parts from another entity in a reverse auction;
    post service parts in an inventory listing service for sale to another entity; and
    purchase service parts posted in an inventory listing service by another entity.

Signed and Sealed this
Twenty-first Day of February, 2012

David J. Kappos
*Director of the United States Patent and Trademark Office*